Figure 1:
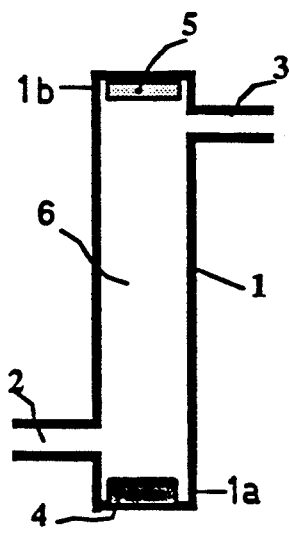

United States Patent [19]

Stuckart

[11] Patent Number: 5,164,094
[45] Date of Patent: Nov. 17, 1992

[54] PROCESS FOR THE SEPARATION OF SUBSTANCES FROM A LIQUID AND DEVICE FOR EFFECTING SUCH A PROCESS

[76] Inventor: Wolfgang Stuckart, Keinergasse 17/14, A - 1030 Wien, Austria

[21] Appl. No.: 455,442
[22] PCT Filed: May 17, 1988
[86] PCT No.: PCT/AT88/00034
    § 371 Date: Nov. 20, 1989
    § 102(e) Date: Nov. 20, 1989
[87] PCT Pub. No.: WO88/09210
    PCT Pub. Date: Dec. 1, 1988

[30] Foreign Application Priority Data

May 19, 1987 [AT] Austria ............... 1269/87

[51] Int. Cl.$^5$ ............................... C02F 1/36
[52] U.S. Cl. ........................ 210/708; 210/738; 210/748; 209/1; 209/155; 422/20; 422/128; 204/157.15; 204/193
[58] Field of Search ........... 210/708, 748, 738; 209/155-159, 1; 422/20, 128; 204/157.15, 193; 366/127

[56] References Cited

U.S. PATENT DOCUMENTS

| | | | |
|---|---|---|---|
| 4,055,491 | 10/1977 | Porath-Furedi | 210/513 |
| 4,358,373 | 11/1982 | Jubenville | 210/181 |
| 4,830,758 | 5/1989 | Bodine | 210/748 |
| 4,854,170 | 8/1989 | Brimhall et al. | 210/748 |
| 4,877,516 | 10/1989 | Schram | 210/748 |
| 4,883,532 | 11/1989 | Bodine | 210/748 |
| 4,885,098 | 12/1989 | Bodine | 210/748 |
| 4,941,135 | 7/1990 | Schram | 210/748 |
| 4,944,886 | 7/1990 | Masri | 210/748 |
| 4,983,189 | 1/1991 | Peterson et al. | 210/748 |
| 5,006,266 | 4/1991 | Schram | 210/748 |

FOREIGN PATENT DOCUMENTS

| | | |
|---|---|---|
| 167406 | 1/1986 | European Pat. Off. |
| 3505161 | 8/1986 | Fed. Rep. of Germany |
| 141715 | 3/1988 | Poland |
| 701670 | 12/1979 | U.S.S.R. |
| 1426950 | 9/1988 | U.S.S.R. |
| 2098498 | 11/1982 | United Kingdom |

*Primary Examiner*—Stanley S. Silverman
*Assistant Examiner*—Neil M. McCarthy
*Attorney, Agent, or Firm*—Spencer, Frank & Schneider

[57] ABSTRACT

A process for the flocculation, precipitation, agglomeration or coagulation of substances or microorganisms present in a liquid in a dissolved, colloidally dissolved, suspended or emulsified state and a device for carrying out the process. The respective liquid is exposed to one or several fields of stationary ultrasonic waves, the ultrasonic frequency f being higher than one seventh of a cutoff frequency fo which depends on the kinematic viscosity of the liquid and the effective radius of the particles present in the liquid.

The device includes an ultrasonic treatment tank which receives the liquid to be purified and is provided with an ultrasonic transducer radiating the ultrasonic waves to an opposing reflecting surface.

23 Claims, 6 Drawing Sheets

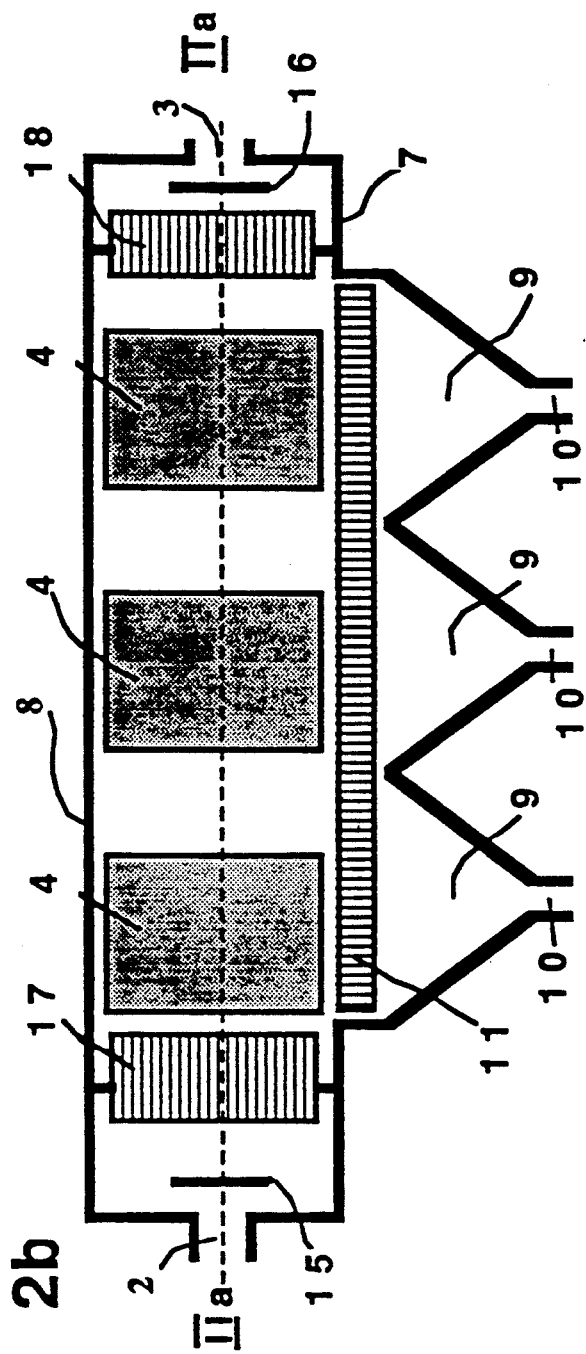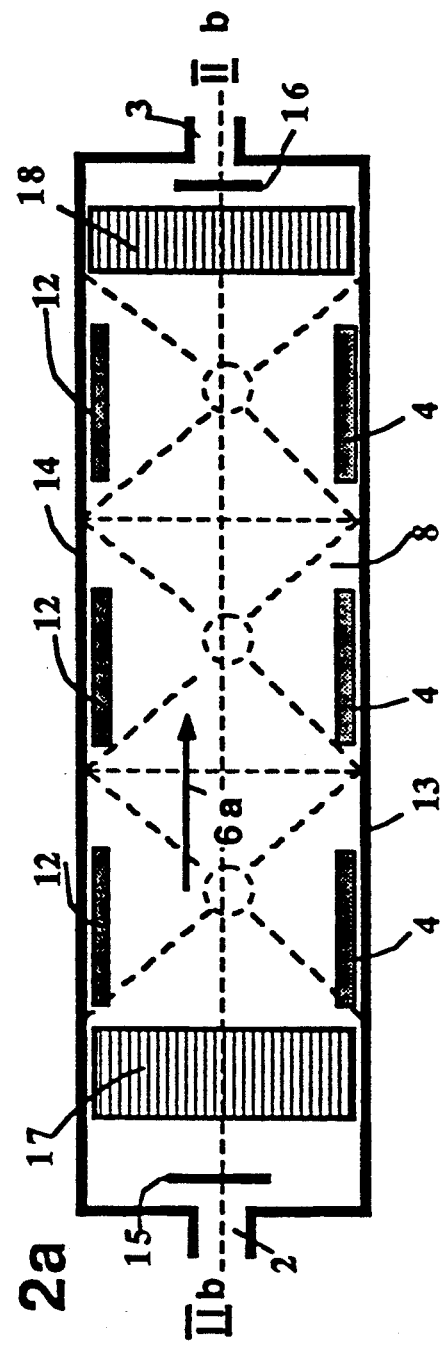
Fig. 2b
Fig. 2a

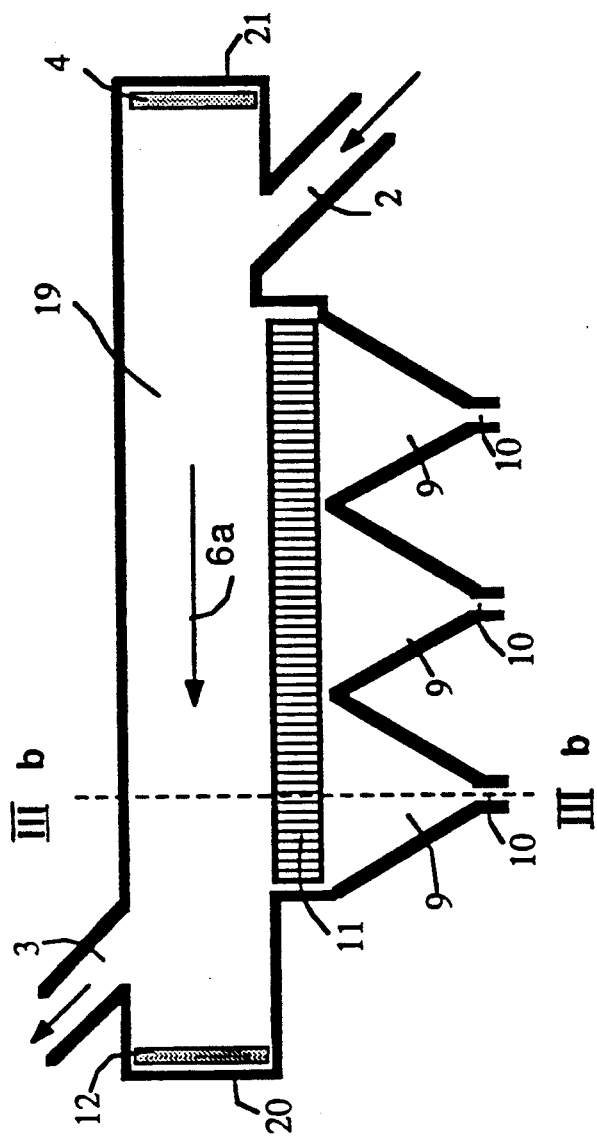
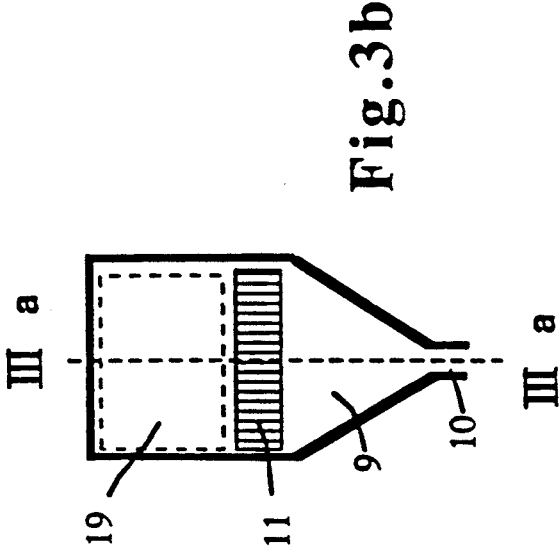
Fig.3a
Fig.3b

PROCESS FOR THE SEPARATION OF SUBSTANCES FROM A LIQUID AND DEVICE FOR EFFECTING SUCH A PROCESS

The invention relates to a process for the flocculation, precipitation, agglomeration or coagulation of substances or microorganisms present in a liquid in a dissolved, colloidally dissolved, suspended or emulsified state and for separating said substances or microorganisms from said liquid, wherein the liquid charged with the substances or microorganisms to be separated is subjected to the field effect of ultrasonic waves which cause an accumulation of particles to be separated in the vibration node regions or vibration bulge regions of the ultrasonic wave and the particles thus accumulated are separated from the liquid, such separation being effected particularly by sedimentation.

In order to separate suspended particles or microorganisms, which may be of submicroscopic dimensions, from liquids by means of sedimentation or filtration within a reasonably short time, these particles or microorganisms have to be combined into larger particles or agglomerated with larger particles. Coagulation processes are made possible in a disperse system by reduction of the electrostatic surface charge of the particles (destabilization) and by supplying kinetic energy (transport).

A process of the type initially mentioned is known wherein particles suspended in liquids are flocculated by subjecting the respective liquid to an ultrasonic wave field and the flocculated material is then separated from the liquid (U.S. Pat. No. 4,055,491).

It is an object of the present invention to provide a process of the type initially mentioned wherein liquids, in particular water, for the purpose of purification, as well as suspensions for the extraction and recovery of raw materials and microorganisms, are treated in the most effective manner in a simple and energy-saving process. Another possibility is the recovery of fine-grained carbon from carbon-containing suspensions, even if said suspensions also contain other substances.

It is known that sound radiation pressure conveys the particles to the velocity bulge surfaces of the ultrasonic field, meaning those sites where the deflection of the water molecules is highest. If the ultrasonic frequency exceeds a determined cutoff frequency fo, the particles follow the vibration of the water only minimally. This means that there is maximum relative movement between the particles and the oscillating water. The water molecules periodically pass the velocity bulge surfaces at right angles at maximum sound velocity. The particles collecting in the velocity bulge surfaces follow the vibrations of the water only minimally and thus cause a reduction of the cross section of the flow path. The velocity of the vibrating water thus has to increase between the particles, forcibly resulting in a local reduction of pressure between the particles at retention of total energy. This relative low pressure between the particles causes their mutual attraction which is used according to the invention for the coagulation of the particles.

The process according to the invention of the type initially mentioned is characterized in that the liquid charged with substances or microorganisms is subjected to one or several fields of stationary ultrasonic waves, the ultrasonic frequency f being greater than one seventh of the cutoff frequency fo, the range above half of the cutoff frequency fo being preferred and fo being defined as follows:

$$f_0(\text{Hz}) = 0.4775 \, n/R^2;$$

wherein n stands for the kinematic viscosity of the liquid in m²/s and R is the effective particle radius in m; in spherical particles, the effective particle radius R is equal to their radii; for particles of other shapes, R is the radius of that sphere of the same material countering the oscillating liquid with the same flow resistance. These measures are well suited for achieving the aforementioned object. A rapid coagulation or agglomeration of the substances contained in the liquid is achieved with low energy requirement. As a result, the provided selection of ultrasonic frequency and exposure to ultrasonic waves in a stationary wave field exert a very favorable influence.

The formation of stationary ultrasonic wave fields can be effected by simply exciting piezoelectric electroacoustic transducers in the resonant frequency or in one of the odd harmonics of the ultrasonic exposure space forming a resonator so that a stationary ultrasonic wave field builds up in the ultrasonic exposure space, the resonator being understood to mean the package of all the acoustic layers exposed to ultrasonic waves including those surfaces on which the sonic waves are reflected.

The forces of a stationary and plane ultrasonic wave field acting on the liquid to be purified cause the particles to arrange themselves in areas extending at right angles to the direction of the propagation of sound. The distance of the areas corresponds to half the length of the ultrasonic waves in the respective liquid. The result is an agglomeration of the particles in the respective areas. The agglomerates formed are so large that they may easily be separated from the liquid by sedimentation or filtration.

In most cases, it is advantageous to expose the liquid to ultrasonic waves during flow. It is also advantageous to make the liquid pass at an approximately right angle to the direction of the propagation of the ultrasonic waves through one or more fields of stationary ultrasonic waves. It is further advantageous if the flow of the liquid is laminar.

When the suspension flows through the ultrasonic field, the particles are held there and agglomerated while the liquid leaves the ultrasonic field in a purified state. A sedimentation space can be provided underneath the ultrasonic exposure space for the removal of the agglomerates. If the direction of sound propagation is horizontal, the particles arrange themselves in vertical planes and sink there, after having formed larger agglomerates, into the sedimentation space under the effect of gravity.

The flow rate of the liquid in the ultrasonic exposure space can be selected to be so high, however, that the coagulates are discharged together with the liquid; the separation of the substances contained therein from the liquid is subsequently effected by sedimentation or filtration.

The liquid may be made to pass through the ultrasonic field in the direction of sound propagation or opposite to it.

An advantageous embodiment of the process according to the invention provides for the liquid to be exposed to ultrasonic waves in a stationary ultrasonic field formed between two parallel and mutually opposed ultrasonic transducers, the opposing ultrasonic transducers being excited by electric oscillations of the same frequency whose mutual phase angle changes constantly and thus brings about a slow relative movement of the wave field in relation to the ultrasonic transducers. The particular advantage of this embodiment resides in the fact that the particles which have arranged themselves in the velocity bulge surface follow the relative movement of the ultrasonic wave field which is advantageously selected to be transverse to the direction of flow of the liquid and can in this way be coagulated with particularly low energy requirement and simply separated from the liquid.

Another embodiment of the process according to the invention provides for the liquid to be exposed to two ultrasonic fields which spatially intersect one another within the space of sonic exposure and act on the liquid simultaneously or alternatingly, preferably using two plane ultrasonic fields intersecting one another at right angles, with the lines of intersection of the vibration node planes extending parallel to the direction of flow of the liquid. A particular advantage of this embodiment consists in the fact that the particles arrange themselves in lines and thus concentrate there to a much higher extent than in the case of one-dimensional exposure to sonic waves. The lines in which the particles arrange themselves constitute the intersection of the velocity bulge planes of the two ultrasonic wave fields.

A further favorable embodiment of the process according to the invention is characterized in that the liquid is exposed to sonic waves in a cylindrical ultrasonic field whose vibration nodes lie in approximately cylindrical and mutually coaxial planes, with the liquid made to pass the field approximately parallel in relation to the geometrical axis of the field, or that the liquid is successively exposed to ultrasonic waves in a plurality of such fields.

Particularly in the case of high energy supply, it is often advantageous to effect the ultrasonic treatment, in order to prevent cavitations, in closed containers or tubes at a pressure which is higher than the sum of the vapor pressure of the liquid and the pressure amplitude of the ultrasonic vibration. The length of the path over which the liquid exposed to ultrasonic treatment is advantageously selected to be less than 1 m, the range of less than 0.6 m being preferred.

The power of the electric oscillations by means of which the ultrasonic transducers are excited is advantageously selected to be less than 3 watt per $cm^2$ of the ultrasonic transducer surface aimed at, the range between 0.5 and 2 watt/$cm^2$ being preferred.

The energy yield per $m^3$ of suspension is selected as a function of its density and the electrostatic surface charge of the suspended particles, advantageously between 0.05 and 10 kWh, the range between 0.1 and 4 kWh being preferred.

Suspensions of mineral substances are advantageously exposed to ultrasonic treatment at ultrasonic frequencies between $f_o/3$ and 10 $f_o$, the use of frequencies between $f_o/2$ and 4 $f_o$ being particularly favorable in case of a broad particle size distribution. For suspended organic substances or substances whose density approximately corresponds to the density of the liquid, it is advantageous to work with frequencies of between 2 $f_o$ and 12 $f_o$, the range between 3 $f_o$ and 5 $f_o$ being preferred.

The coagulation of carbon particles present in water and their separation are advantageously effected at ultrasonic frequencies of between $f_o/2$ and 10 $f_o$, with a particularly intensive flocculation being achieved in the range between $f_o$ and 4 $f_o$. The coagulation of components of higher density—such as, for example, metallic powders—is advantageously carried out at ultrasonic frequencies of between $f_o/7$ and 10 $f_o$, the range between $f_o/6$ and $f_o/2$ being preferred in view of an economical use of energy.

During the growth of the coagulates, their radius R increases and the cutoff frequency $f_o$ depending on R decreases. In certain cases, it is advantageous to perform the ultrasonic treatment in two or more successive steps at decreasing frequency. The agglomerates formed in the first step can then be combined again in the subsequent steps. The radius R of the agglomerates can increase to a maximum of a quarter of the respective length of the ultrasonic waves.

In many cases, a much faster coagulation can be achieved by treatment with amplitude-modulated ultrasonic waves. An amplitude modulation at frequencies up to 20 kHz proved particularly favorable, sinusoidal and rectangular signals being suitable as modulation signals.

Independently of a possible modulation, it is advantageous in some cases to carry out the ultrasonic treatment intermittently.

Activated carbon or other surface-active substances such as, for example, some clays are often used as adsorption media for substances contained in liquids that may be present in the dissolved state. Adding the adsorption media in the form of powders causes a more intimate mixing with the liquid and thus permits shorter contact periods, thus preventing desorption processes. Following an ultrasonic treatment according to the process of the present invention, the agglomerated particles can be separated from the liquid by sedimentation or filtration. Moreover, the ultrasonic treatment can promote the agglomeration of the substances present in the liquid on the adsorption medium.

In order to facilitate the mutual approach of the particles, it is often advantageous to decrease or neutralize possibly existing electrostatic surface charges of the particles by adding flocculants in measured quantities. In some cases, the addition of polymers as flocculation promoters may be useful for increasing the mechanical stability of the agglomerates.

By the addition of up to 5 percent of oil, the separation of carbon in water can be improved in that larger and more stable flakes are formed.

The invention further relates to a device for carrying out the process according to the invention.

An advantageous embodiment of such a device is characterized in that the ultrasonic treatment space of the device is formed by a straight tube which is closed tightly and at right angles on one end by an ultrasonic transducer and on the other end by a preferably reverberant reflector, with the inlet and outlet for the liquid to be subjected to ultrasonic treatment being provided laterally close to the two tube ends.

Another advantageous embodiment of such a device is characterized in that the ultrasonic treatment space of the device is formed by a straight tube closed at right angles and tightly at its lower end by an ultrasonic transducer and open at its upper end, the inlet and outlet for the liquid to be subjected to ultrasonic treatment being provided laterally close to the two tube ends.

A very simply constructed device is characterized in that the device is provided with an ultrasonic treatment basin on whose bottom one or several ultrasonic transducers is (are) disposed horizontally.

A preferred embodiment of the device according to the invention is provided with an ultrasonic treatment tank, preferably in the shape of a right parallelpiped, which may be open on top and forms the ultrasonic treatment space for the liquid; this ultrasonic treatment tank is provided, on one side wall parallel to the horizontal flow direction of the liquid, with one or more ultrasonic transducers and, on the opposite parallel side wall, with sound reflectors. The propagation of sound is thus horizontal and at right angles to the direction of flow. The inlet and outlet for the liquid are provided on the two side walls extending at right angles to the direction of flow. The bottom of the ultrasonic treatment tank is provided with one or more, preferably funnel-shaped sedimentation space(s) having removal means on their lowermost points. The sedimentation spaces are preferably separated from the ultrasonic treatment tank by a horizontal grid-like flow screen. Vertical smoothing grids extending at right angles to the direction of flow may be provided downstream from the inlet and upstream from the outlet. A baffle may be provided directly in front of the inlet opening and the outlet opening, respectively, of the ultrasonic treatment tank.

A further embodiment of the device according to the invention is characterized in that the ultrasonic treatment space of the device is formed by an ultrasonic treatment chamber through which the liquid flows horizontally, and in that one or a plurality of ultrasonic transducers or ultrasonic transducers and reflectors are arranged opposite and parallel to one another at the two lateral walls of the ultrasonic treatment chamber extending at right angles to the direction of flow, and in that one or a plurality of funnel-shaped sedimentation spaces are provided in the bottom of the ultrasonic treatment chamber, said sedimentation spaces preferably being delimited on top by flow screens and provided in their lowermost points with removal means for the settled particles.

A further advantageous embodiment of the device according to the invention is characterized in that the ultrasonic treatment space of the device is formed by a vessel in the form of a straight cylinder of preferably reverberant material in which a cylindrical, radially oscillating ultrasonic transducer is coaxially installed. An advantageous further development results if the cylindrical ultrasonic transducer is of tubular shape, the flow of liquid flowing through its interior and around its exterior. In this configuration, the common axis of the transducer and the vessel can be vertical, with the liquid made to pass first from top to bottom through the interior of the tubular ultrasonic transducer and then being discharged at its lower end into the outer vessel from where it flows upwards while the coagulates settle down and are thus separated from the liquid.

A further embodiment of the device according to the invention is characterized in that the ultrasonic treatment space of the device is formed by an ultrasonic treatment tank in the shape of a right parallelpiped into which two plane walls extending at right angles to one another and carrying groups of ultrasonic transducers are inserted, with the walls extending parallel to the lateral faces of the ultrasonic treatment tank and preferably intersecting one another within the ultrasonic treatment space in such a manner that the ultrasonic treatment space is divided into two or more partial spaces through which the flow may pass.

The flow-through ultrasonic treatment tank can be subdivided in this way for instance into four partial chambers which may have different cross sections and which are traversed by the liquid parallel as well as in series, with the flow through the individual partial chambers possibly being oriented in opposite directions.

A further embodiment of the device according to the invention is characterized in that a parallel plate separator, through whose spaces between the separator plates the liquid is made to pass, is provided in the ultrasonic treatment space of the device and that two plane groups of ultrasonic generators are arranged parallel to the stack of separator plates, with the entire stack of separator plates being disposed between the ultrasonic transducers, and the thickness of the separator plates preferably corresponding to an odd multiple of a quarter of the wave length of the ultrasound in said separator plates, and in that the surface roughness of the separator plates does not exceed one tenth of the ultrasonic wavelength. A stationary wave field is generated and moves in relation to the ultrasonic transducers in such a manner that the vertical component of the relative movement is directed downward. The particular advantage of this embodiment lies in the fact that the particles are coagulated in the ultrasonic field and are conveyed to the separator plates in accordance with the movement of the field, and then settle on the separator plates, whereby an essentially higher separating performance than in conventional parallel separator plates can be achieved.

In addition to the conventional electroacoustic ultrasonic transducers of piezoceramic materials, the device according to the invention can advantageously be provided—in particular for higher frequencies—with ultrasonic transducers of piezoelectric plastics such as polyvinylidene fluoride (PVDF). In the production of the PVDF-transducer, a metal plate is coated porefree with PVDF. The PVDF layer is subsequently polarized and the free surface is provided with The invention is further explained by means of exemplary embodiments which are shown in the drawings.

Figure 5:
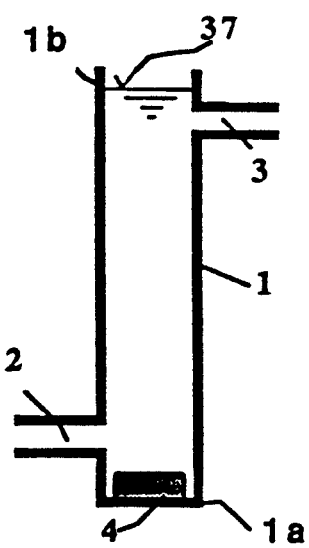
Figure 4A:
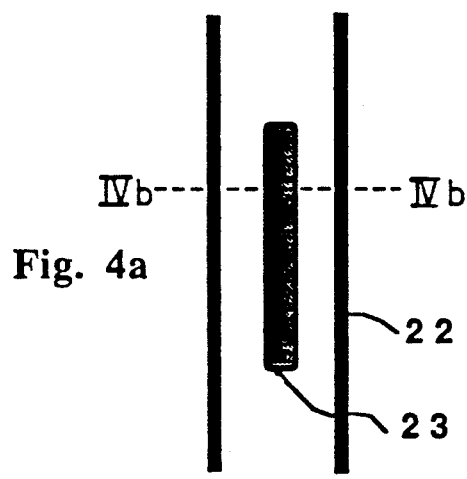
Figure 6:
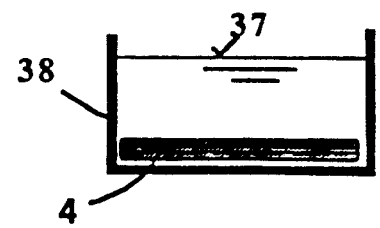
Figure 4B:
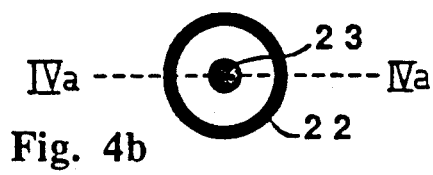
Figure 8:
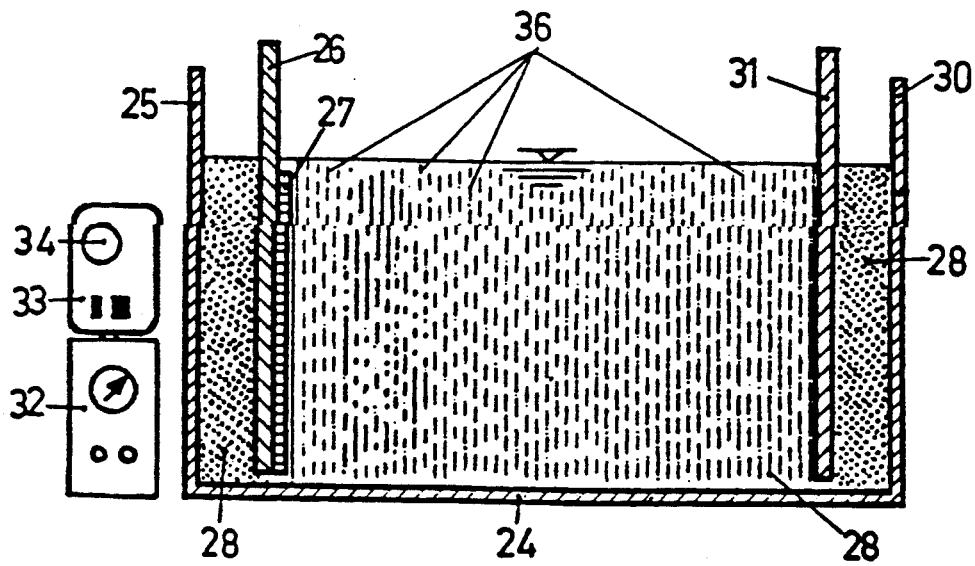
Figure 7:
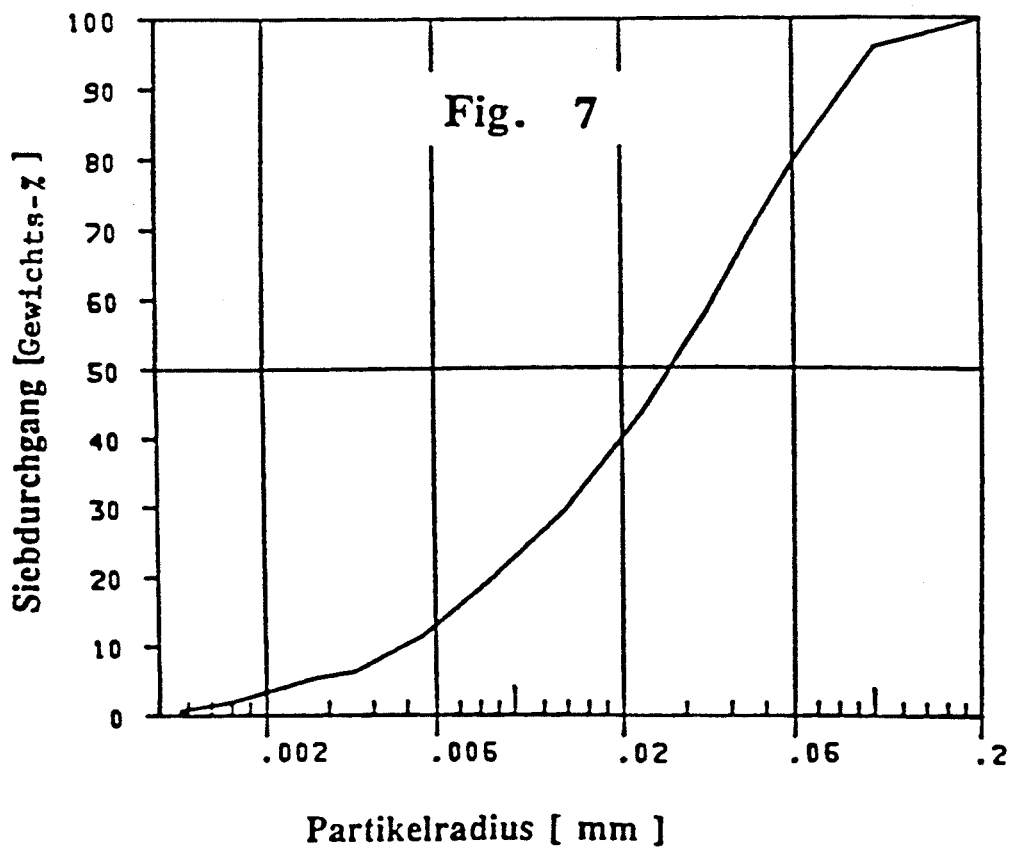
Figure 9A:
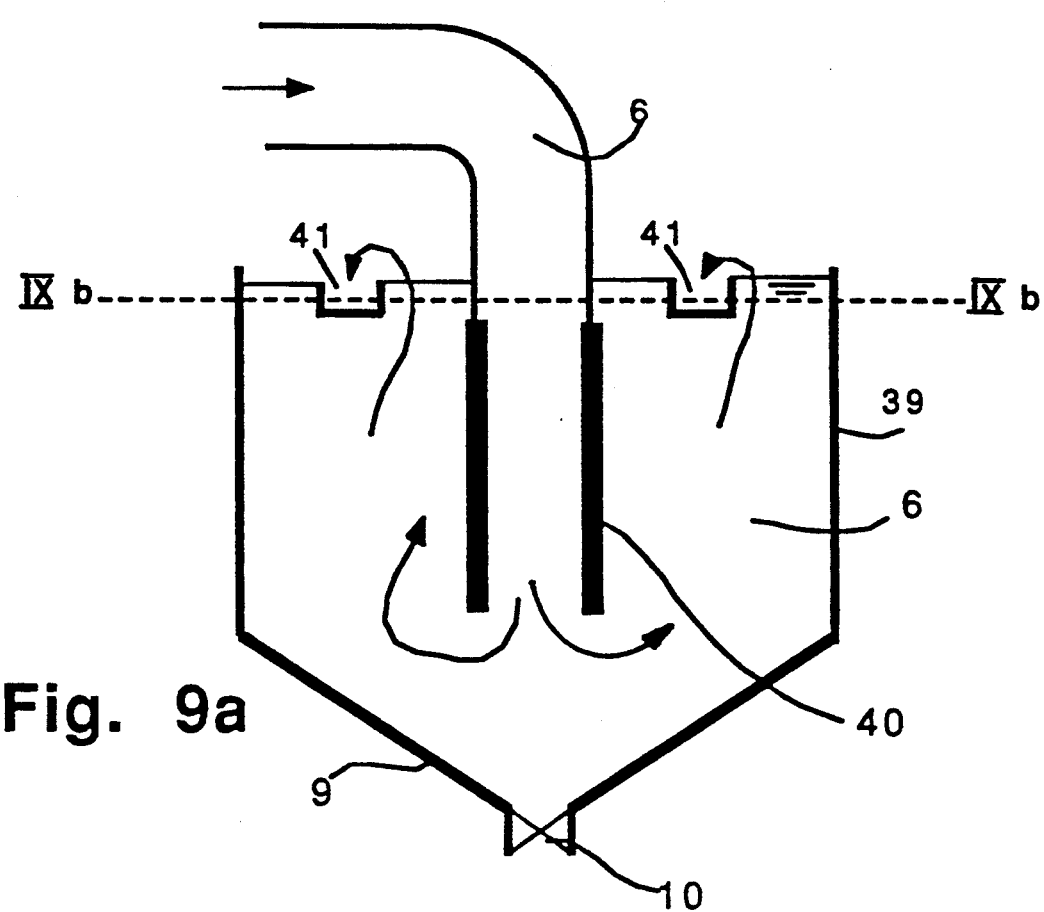
Figure 9B:
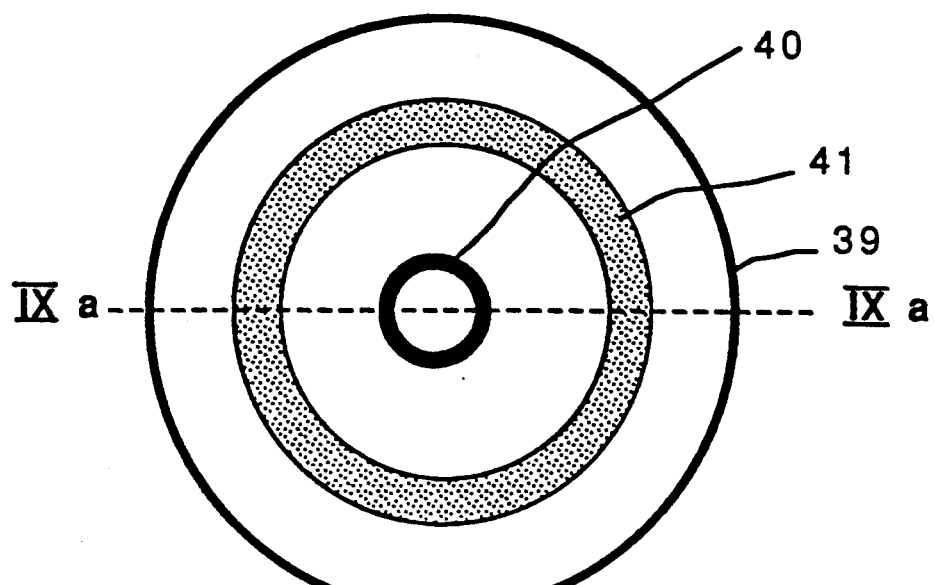
Figure 11:
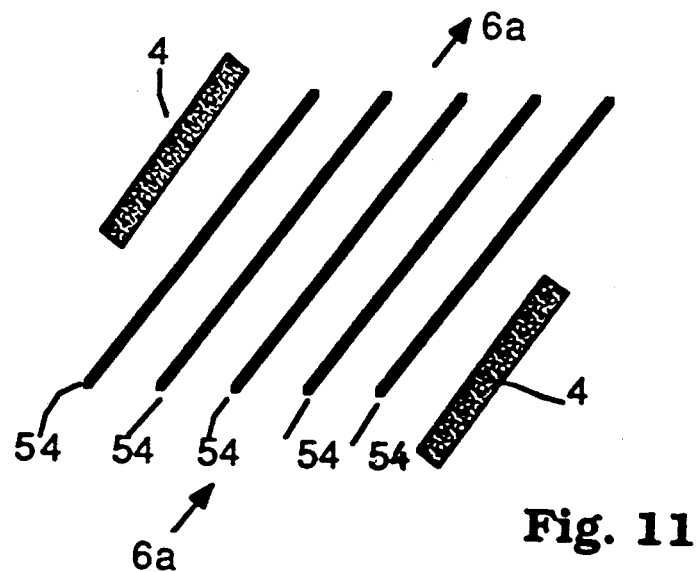
Figure 10:
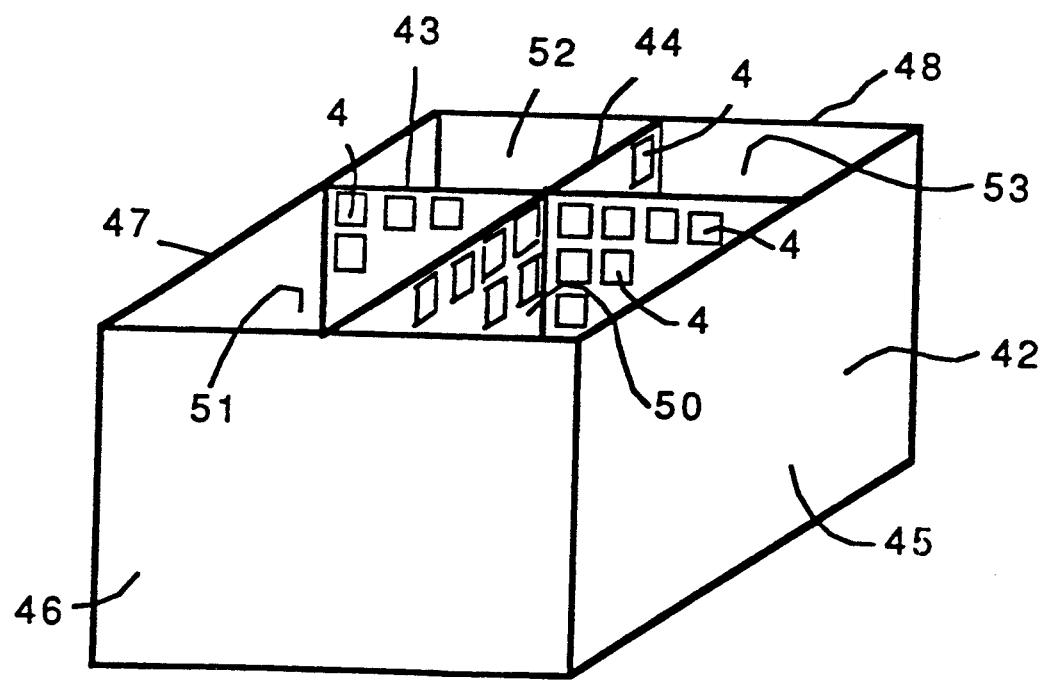

It is shown in:

FIG. 1, a sectional view of the first embodiment of the device according to the invention;

FIG. 2a, a horizontal cross sectional view of a second embodiment of the device according to the invention along line IIa—IIa in FIG. 2b, and FIG. 2b is a sectional view of this embodiment along line IIb—IIb;

FIG. 3, a longitudinal section of another embodiment of the device according to the invention along line IIIa—IIIa in FIG. 3b, and FIG. 3b shows this embodiment in section along line IIIb-IIIb;

FIG. 4a, a vertical section of a further embodiment of the device according to the invention, and FIG. 4b shows a sectional view of this embodiment along line IVb—IVb in which a coaxial, cylindrical wave field is generated in a tube;

FIG. 5, a vertical section of an embodiment of the device according to the invention in which the free surface of the liquid serves as a sound reflector;

FIG. 6, a vertical section of a further embodiment of the device according to the invention in which a vat is exposed to ultrasound from below;

FIG. 7, the particle size distribution line of a carbon powder present in an aqueous suspension;

FIG. 8, a testing structure including a device according to the invention;

FIG. 9a, a further embodiment of the device according to the invention in vertical section, and FIG. 9b represents this embodiment in section along line IXb—IXb;

FIG. 10, a view of an embodiment of the device according to the invention showing two-dimensional exposure to ultrasonic waves; and FIG. 11, a basic sketch of an embodiment of the device according to the invention provided with a parallel plate separator.

In the device illustrated in FIG. 1, the ultrasonic treatment space is provided in the form of a straight tube 1 into which the liquid 6 is passed through a inlet connection piece 2 and discharged through an outlet connection piece 3. The one tube end 1a is tightly closed at a right angle by means of an ultrasonic transducer 4, the other tube end 1b by means of a reflector 5 shaped as a rigid metal plate. The ultrasonic transducer 4 is supplied with high frequency current.

In the device shown in FIG. 2a and 2b, the ultrasonic treatment space is provided in the form of an ultrasonic treatment tank 8 into whose bottom 7 sedimentation funnels 9 are inserted and provided in their lowermost parts with closable discharge connections 10. The sedimentation funnels 9 are separated from the ultrasonic treatment tank by a grid-like flow screen 11. Ultrasonic transducers 4 and ultrasonic reflectors 12 are provided opposite and parallel in relation to one another on the two side walls 13 and 14 of the ultrasonic treatment tank 8 and extend parallel to the direction of flow 6a. Flow screens 15 and 16 and smoothing grids 17 and 18 are provided downstream from the inlet connection piece 2 and upstream of the outlet connection piece 3. The direction of flow 6a extends at a right angle to the direction of sound propagation.

The device shown in FIGS. 3a and 3b includes an ultrasonic treatment space in the form of an ultrasonic treatment chamber 19 on whose lateral front walls 20 and 21 the ultrasonic transducer 4 and the reflector 12 are disposed. The bottom of the ultrasonic treatment chamber 19 is provided with funnel-shaped sedimentation spaces 9 on whose lowermost parts closable removal connections 10 are provided. The sedimentation spaces 9 are separated from the ultrasonic treatment chamber 19 by a grid-like flow screen 11. The liquid is supplied via the inlet collection piece 2 and discharged via the outlet connection piece 3. The direction of flow 6a extends in the direction of sound propagation. The lateral front walls 20, 21 extend at right angles to the direction of flow.

In the device shown in FIGS. 4a and 4b, the ultrasonic treatment space is designed as a vessel 22 in the shape of a straight cylindrical tube made of reverberant material into which a cylindrical, radially oscillating ultrasonic transducer 23 is coaxially inserted. A cylindrical ultrasonic field extending coaxially thereto is generated in the interior of vessel 22.

The device shown in FIG. 5 comprises a straight vertical tube 1 into which the liquid is supplied via a connection piece 2 and from which it is discharged via a further connection piece 3. The lower tube end 1a is tightly closed by means of an ultrasonic transducer 4. The upper tube end 1b is open. In this case, the free liquid surface 37 acts as an acoustic reflector.

The device shown in FIG. 6 is provided with an ultrasonic treatment basin 38 which is open on the top and on whose bottom an ultrasonic transducer 4 is horizontally installed. The free liquid surface 37 acts as an acoustic reflector.

The testing structure shown in FIG. 8 is provided with a device according to the invention whose ultrasonic transducer 27 is fed by a broadband amplifier 33 which is controlled by a high frequency signal generator 32. The ultrasonic treatment space of the device is formed by an ultrasonic treatment basin 24. On one narrow side 25 of the ultrasonic treatment basin 24, the ultrasonic transducer 27 is disposed on a brass plate 26 and a reflector in the form of a brass plate 31 is disposed on the opposite narrow side 30.

The device shown in FIGS. 9a and 9b includes a vertical cylindrical ultrasonic treatment tank 39 as an ultrasonic treatment space. The tank 39 is closed on the bottom by a funnel-shaped sedimentation space 9 which is provided with a closable removal connection 10. A tubular ultrasonic transducer 40, through which the liquid is passed into the ultrasonic treatment space, is coaxially installed in the ultrasonic treatment tank 39. A horizontal, circular groove 41 for discharging the purified liquid is provided on the upper end of the ultrasonic treatment tank 39. The liquid 6 to be subjected to ultrasonic treatment then flows through the ultrasonic transducer 40 and into the ultrasonic treatment tank 39 on the outside of said transducer and is then discharged via groove 41.

FIG. 10 represents a device provided with an ultrasonic treatment tank 42 in the shape of a right parallelepiped in which two walls 43 and 44 carrying ultrasonic transducers 4 are installed. The walls 43 and 44 extend parallel to the lateral surfaces 45, 46, 47, 48 of the ultrasonic treatment tank 42 and extend at right angles in relation to one another and intersect one another so that the ultrasonic treatment space is divided into four partial flow-through spaces 50, 51, 52, 53. The ultrasonic transducers form ultrasonic fields which intersect one another at right angles in the partial spaces.

The device represented in FIG. 11 is provided with a parallel plate separator including a group of inclined and mutually parallel separator plates 54 and two ultrasonic transducers 4 extending parallel to the separator plates.

The process according to the invention is explained in detail by way of the following example:

EXAMPLE

A testing device according to FIG. 8 was used and the ultrasonic treatment basin 25 of the device in the shape of a right paralellpiped which had the dimensions 12×6×5 cm was filled with an aqueous carbon suspension 28. The carbon portion of the suspension 28 was about 10 g/l. The particle size distribution curve of the suspended carbon particles is shown in FIG. 7. Prior to the ultrasonic treatment test, the rapidly sedimentable particle size fraction was separated from the carbon suspension 28 by sedimentation.

On a narrow side 25 of the ultrasonic treatment basin 24, a piezoceramic disk 27 of a diameter of 20 mm and a thickness of about 2 mm conductively glued to a brass plate 26 was immersed in the suspension 28, with brass plate 26 in a vertical position. At the opposite narrow side 30 of the ultrasonic treatment basin 24, a brass plate 31 of a thickness of about 3 mm was immersed in the suspension 28 vertically and parallel to the piezoceramic disk 27.

The piezoceramic disk was then subjected to a high frequency alternating voltage with a frequency of 1.1

MHz. The high frequency voltage was generated by means of a signal generator 32 and a broadband amplifier 33. The forward as well as the reflected electric power were measured by means of a high frequency wattmeter 34. In the present test, the forward power was measured to be 7 watt. Virtually no reflected power was apparent. About 20 seconds after the start of the ultrasonic treatment, the carbon particles arranged themselves in vertical planes 36 having a mutual normal distance of about 0.7 mm and extending parallel to the piezoceramic disk 27.

After approximately 20 seconds, a coagulation of the carbon particles in the planes 36 could clearly be observed with the naked eye. The coagulates were already starting to sediment during the ultrasonic treatment, which was stopped after about 4 minutes. The coagulates remained stable after termination of the ultrasonic treatment.

I claim:

1. Process for the agglomeration of a substance present in a liquid in an unagglomerated state and for separating said agglomerated substance from said liquid, comprising:

subjecting said liquid charged with the substance in an unagglomerated state to be separated to a field of stationary ultrasonic waves, the liquid charged with the substance in an unagglomerated state flowing at an approximately right angle to the horizontal direction of the propagation of ultrasound through at least one field of stationary ultrasonic waves having an ultrasonic frequency f greater than one seventh of the frequency fo, the frequency fo being defined as follows:

$$fo \text{ (Hz)} = 0.4775 \, n/R^2$$

wherein n stands for the kinematic viscosity of the liquid in $m^2/s$ and R is the effective particle radius in m until an accumulation of agglomerated particles separates in the vibration node regions or vibration bulge regions of the ultrasonic wave field, and separating the agglomerated particles thus accumulated from the liquid by way of sedimentation.

2. The process according to claim 1, wherein the liquid is passed through the ultrasonic wave field or fields in laminar flow.

3. The process according to claim 1, wherein said stationary ultrasonic wave field is formed between two parallel and mutually opposed ultrasonic transducers and said liquid charged with the substance to be separated in an unagglomerated state is subjected to said ultrasound in the horizontal direction of flow.

4. The process according to claim 1, wherein said liquid charged with the substance to be separated in an unagglomerated state is exposed to two simultaneous or alternating ultrasonic fields which spatially intersect one another within an ultrasonic treatment chamber, with two plane ultrasonic fields intersecting one another at right angles preferably being used and the lines of intersection of the vibration node planes extending parallel to the direction of flow of the liquid.

5. The process according to claim 1, wherein said liquid charged with the substance to be separated in an unagglomerated state is exposed to ultrasonic treatment in at least one cylindrical ultrasonic field whose vibration nodes lie in approximately cylindrical and mutually coaxial planes, with the liquid made to pass the field approximately parallel in relation to the geometric axis of the field.

6. The process according to claim 1, including ultrasonic transducers supplied with electric oscillations with a power in the range between about 0.5 and 3 watt/$cm^2$ fed to the transducer surface.

7. The process according to claim 1, wherein the liquid to be treated is supplied with an ultrasonic energy between about 0.05 and 10 kWh per $m^3$.

8. The process according to claim 1, wherein ultrasonic frequencies between about fo/3 and 10 fo are used for the treatment of mineral substance suspensions.

9. The process according to claim 1, wherein a liquid containing a substance in an unagglomerated state whose density approximately corresponds to the density of the liquid is subjected to ultrasonic frequencies between about 2 fo and 15 fo.

10. The process according to claim 1, wherein for the coagulation of carbon particles present in water ultrasonic frequencies between about fo/2 and 10 fo are used.

11. The process according to claim 1, wherein a liquid containing a substance in an unagglomerated state whose density essentially differs from the density of the liquid, subjected to ultrasonic frequencies between about fo/7 and 10 fo.

12. The process according to claim 1, including more than one ultrasonic frequency in the course of the ultrasonic treatment of the liquid.

13. The process according to claim 1, wherein the ultrasonic treatment of the liquid is carried out intermittently.

14. The process according to claim 1, wherein the ultrasonic treatment of the liquid is carried out by means of amplitude-modulated ultrasonic waves.

15. The process according to claim 14, wherein ultrasonic waves, amplitude-modulated by means of a frequency of less than about 20 kHz, are used.

16. The process according to claim 1, wherein an agent in the form of a powder for adsorption of said agglomerated substance, is added to the liquid prior to the ultrasonic treatment.

17. The process according to claim 1, wherein at least one flocculant or flocculant adjuvant is added to the liquid containing a substance in an unagglomerated state in measured quantities prior to the ultrasonic treatment in order to allow or improve coagulation of the substance contained therein.

18. A device, having an ultrasonic treatment chamber, through which a liquid to be treated flows, said device provided with an ultrasonic transducer which generates a stationary field of horizontally propagating ultrasound waves in the ultrasonic treatment chamber at approximately at right angle to the direction in which liquid flows, said stationary ultrasonic waves having an ultrasonic frequency f greater than one seventh of the frequency fo, the frequency fo being defined as follows:

$$fo \text{ (Hz)} = 0.4775 \, n/R^2$$

wherein n stands for the kinematic viscosity of the liquid in $m^2/s$ and R is the effective particle radius in m, and said ultrasonic treatment chamber is formed by a vessel in the form of a straight cylinder in which a cylindrical, radially oscillating ultrasonic transducer is coaxially installed.

19. The device according to claim 18, wherein the cylindrical radially oscillating ultrasonic transducer is of tubular shape and the liquid flows through its interior as well as around its exterior.

20. The process according to claim 1, wherein said agglomeration is flocculation, and said substance to be separated is present in said liquid in a colloidal suspension.

21. The process according to claim 1, wherein said agglomeration is precipitation, and said substance to be separated is dissolved in said liquid.

22. The process according to claim 1, wherein said agglomeration is coagulation, and said substance to be separated is present in said liquid in an emulsified state.

23. A device, having an ultrasonic treatment chamber, through which a liquid to be treated flows, said device provided with an ultrasonic transducer which generates a field of stationary ultrasound waves in the ultrasonic treatment chamber at approximately a right angle to the horizontal direction in which liquid flows, said stationary ultrasonic waves having an ultrasonic frequency f greater than one seventh of the frequency fo, the frequency fo being defined as follows:

$$fo\ (Hz) = 0.4775\ n/R^2$$

wherein n stands for the kinematic viscosity of the liquid in $m^2/s$ and R is the effective particle radius in m.

* * * * *